UNITED STATES PATENT OFFICE.

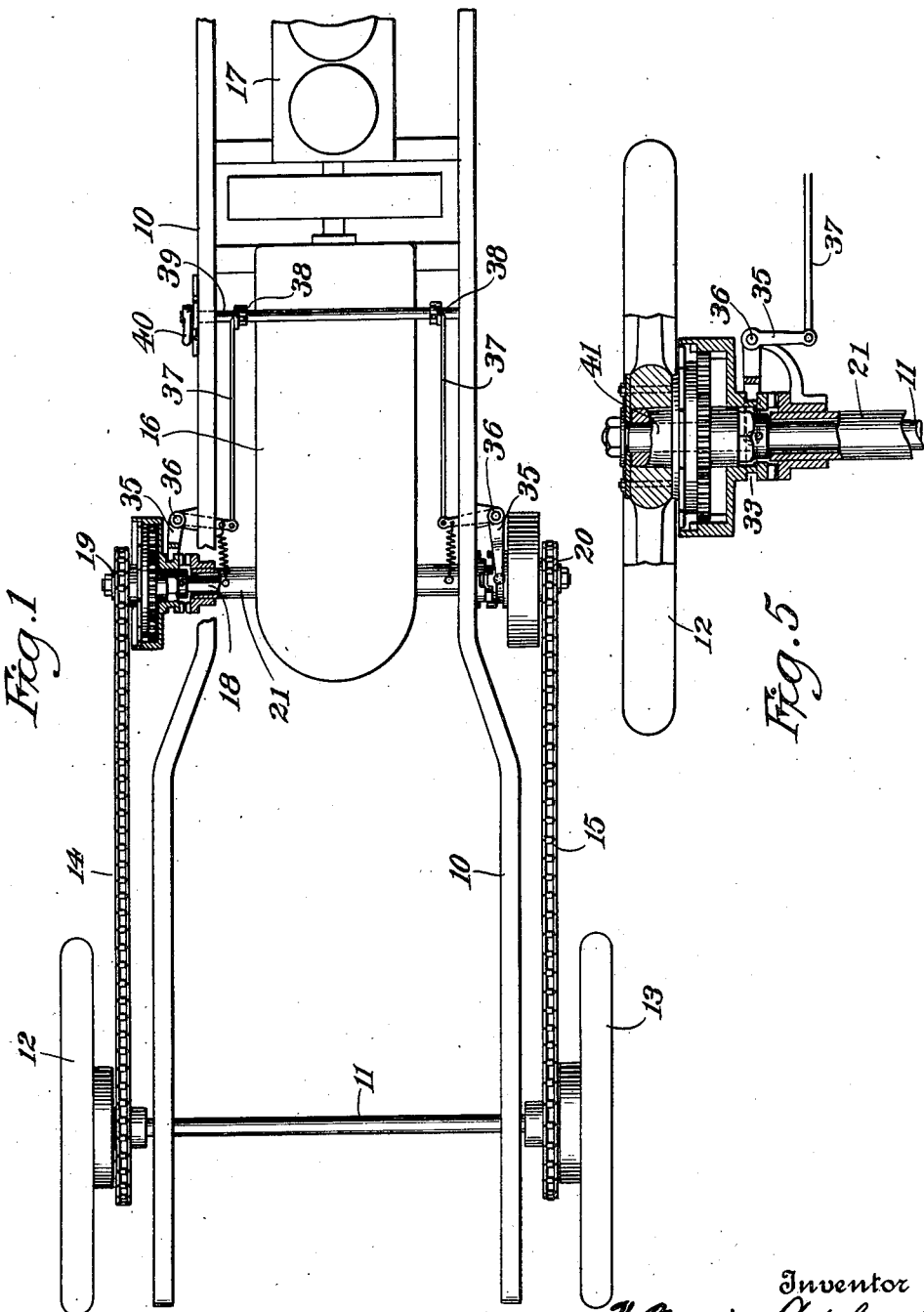

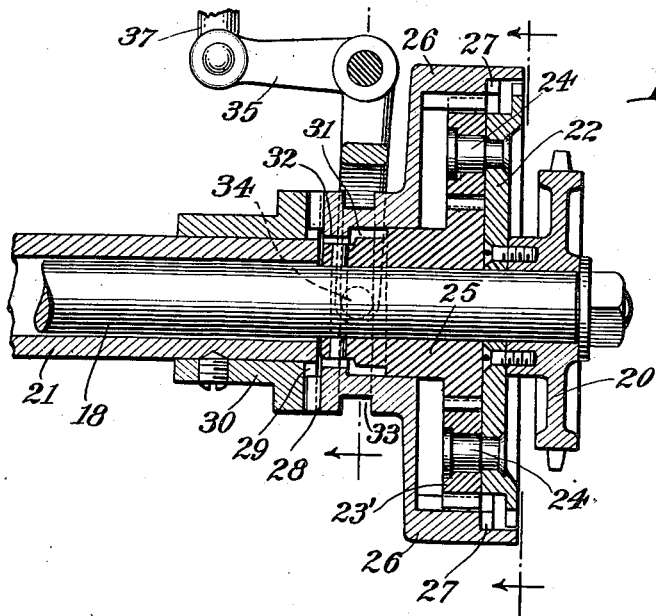

WILSON MARION COPELAND, OF EVANSVILLE, INDIANA.

AUXILIARY TRANSMISSION FOR MOTOR-VEHICLES.

1,240,318.　　　　　Specification of Letters Patent.　　Patented Sept. 18, 1917.

Application filed February 15, 1917.　Serial No. 148,769.

*To all whom it may concern:*

Be it known that I, WILSON MARION COPELAND, a citizen of the United States, residing at Evansville, county of Vanderburg, and State of Indiana, have invented certain new and useful Improvements in Auxiliary Transmissions for Motor-Vehicles, of which the following is a full, clear, and exact description.

The invention which constitutes the subject matter of this application relates to a transmission device for motor vehicles, the objects of which will appear from the detailed description below, but it may be stated in this connection that my invention is one that may be placed on any car and is chiefly desirable in case of trucks or a pleasure car to be employed for commercial purposes. With these commercial vehicles it is impossible to run at high speed without overheating the engine. This running at high speed is very desirable when the truck is empty and with the form of transmission which I have herein shown and described this may be accomplished by an auxiliary transmission mechanism wholly independent of the transmission with which the car is already equipped; that is to say independent of the ordinary transmission.

In the drawings:—

Figure 1 illustrates one of the methods of power transmission employed by motor car designers, consisting of the side chain system, in connection with which I have applied my invention.

Fig. 2 is an enlarged longitudinal sectional view of my invention as applied to the power transmission illustrated in Fig. 1.

Fig. 3 is a cross section taken on line 3—3 of Fig. 2.

Fig. 4 illustrates a detail.

Fig. 5 illustrates the application of my invention to the rear axle-shaft instead of the jack-shaft shown in Fig. 1.

In detail the reference numeral 10 designates the chassis, 11 the rear axle, 12 and 13 the rear wheels, 14 and 15 the chains for driving the wheel, 16 the ordinary transmission and 17 the engine. All of these parts are conventional of one type of motor vehicles to which I make no claim. It will be noted that I have illustrated only such parts of the motor vehicles as will be necessary to explain the relation of my invention thereto.

Referring specifically to Figs. 1 to 4 inclusive the reference numeral 18 designates the counter shaft upon the ends of which are mounted the sprocket wheels 19 and 20 and surrounding which is a stationary jackshaft or counter-shaft housing 21 fixed to any suitable part of the vehicle. See Figs. 1 and 2. Permanently fixed to the sprocket gear 20 and surrounding the countershaft 18 is a disk member 22 provided with a plurality of annular male clutch engaging flanges 23 (see Fig. 3). This disk member 22 carries a plurality of planetary gears 23 mounted upon arbors 24 projecting from one face thereof. These planetary gears mesh with a central or sun gear 25 splined or otherwise fixed to the counter shaft 18. These planetary gears are also at all times enmeshed with an internal gear on the clutch member 26. The latter is provided with female sockets 27 adapted, when it is moved outwardly, to receive the male flange 23 of the disk 22 and thereby cause the clutch member and disk to move as a unit. The opposite end of the clutch member is provided, among other things, with teeth 28 which enmesh with the teeth 29 on the fixed tooth collar 30, whenever the clutch is moved inwardly. The sun gear 25 is provided with a hexagonal portion 31 over which the internal hexagon 32 on the clutch 26 is adapted to telescope when the latter is moved to the right. The clutch member 26 is also provided with an external groove 33 which receives the studs 34 from the bell crank lever 35 which is pivoted at 36. This bell-crank lever is connected by link 37, arm 38 and shaft 39 to the shifting or controlling lever 40.

The operation of this device, so far as Figs. 1, 2, 3 and 4 are concerned, is as follows: In the position illustrated in 2 the teeth 28 on the clutch member 26 are engaged with the teeth 29 on the fixed housing 21 which holds said clutch member against rotation; that is the device is in "low". If the vehicle is in operation the sun gear 25 rotates the sprocket wheel 20 through the disk 22 and planetary gears 23. Since the sun gear fixed to the countershaft must execute several rotations before the planetary gears have traveled around the internal gear on the clutch 26 it will be obvious that the toothed member 23 will be rotated at a relatively low speed. If now the clutch 26 is shifted to the right the teeth 28 will be disengaged from the teeth 29 and the hexagonal portion 32 on said clutch will telescope over the hexagonal portion 31 on the sun-gear. This will cause the sun-gear 25, clutch 26, planetary gears 23, disk 22 and sprocket wheel 20 to rotate at the same angular velocity as the counter-shaft 18. In other words the shifting of the clutch 26 to the right will throw the device into high. At the same time that hexagonal portion 31 telescopes with the internal hexagonal 32 the male members 23 located on the outer periphery of the disk 22 will enter the female sockets 29. This provides an additional clutch or lock which not only serves to increase or augment the strength of the transmission as a whole but reduces the wear to a minimum. The two clutching or locking features just referred to are located adjacent the opposite ends of the clutch member 26 which enables me to eliminate any false strains which would otherwise be set up therein. It will also be noted that the sun and planet gears are always in mesh and that the internal gear on the clutch member is always in mesh with said planet gears. The entire set of gears employed is therefore in mesh whether in high or low and during the shifting from one speed to the other. The shifting is therefore accomplished without any grinding action taking place as in the ordinary form of transmission devices.

In Fig. 5 I have illustrated my invention as applied directly to the wheels, only one wheel however being shown. It is unnecessary to explain the parts in detail. From a comparison of Fig. 5 with Fig. 2 it will be apparent that there are only these differences, namely, that in lieu of a countershaft 18 I have the rear axle shaft 11 and in lieu of mounting the sprocket wheel 20 on disk 22 I provide the disk in Fig. 5 with a hub 41 and mount the rear wheel 12 directly thereon.

From the foregoing it will be apparent that a different variation of speed ratio between the driven shaft and driving device (or wheel) may be had by varying the relative size of the gears employed in the planetary system. It is also apparent that the device is capable of reverse operation, that is to say, the driving member may be made the driven member and vice versa. It will be noted that the planetary system of gearing is mounted to rotate in a fixed plane, that is to say, the sun and planetary gears are fixed relative to each other so far as lateral movement is concerned. The only laterally movable element therefore is the clutch member 26. This enables the device to operate with the least possible amount of wear and tear and at the same time reduces the number of parts to a minimum.

It is to be further understood that I do not limit myself to the exact constructions illustrated and described, as many changes may be made in point of detail and other embodiments resorted to without necessarily deviating from the true spirit and scope of my invention.

What I claim is:

1. In a device of the class described, a shaft, in combination with a transmission mechanism mounted upon said shaft comprising a sun gear fixed to said shaft, a device associated with said shaft to which varying speeds are imparted, a plurality of planetary gears mounted upon said device and meshing with the teeth on the sun gear, a movable clutch provided with an internal gear meshing with the planetary gears, means for holding said clutch stationary when in one position so as to effect a low speed to said device, and means for permitting said clutch when thrown to another position to rotate in unison with said sun gear so as to effect a high speed to said device.

2. In an auxiliary transmission, a rotatable power shaft, a device carried by said shaft and adapted to be rotated thereby, in combination with mechanism for imparting variable speeds from said shaft to said device comprising a system of sun and planetary gearing, rotatable and revoluble in one plane only and movable means coöperating with said gearing for effecting the different speeds.

3. In an auxiliary transmission, an axle shaft, a wheel rotatably mounted upon said shaft and adapted to be rotated thereby, in combination with mechanism for varying the relative angular velocities between said shaft and wheel, comprising a sun gear and planetary gears, fixed relatively to each other with respect to lateral movement, a clutch member, and means operable from the machine for actuating said clutch member to effect said variable velocities.

4. In an auxiliary transmission mechanism for motor vehicles, a driving shaft, a driven device rotatably mounted upon said shaft, in combination with mechanism connecting said shaft and said device for varying the relative angular velocities between said shaft and device comprising a system of planetary gearing rotatable in a fixed plane and a clutch member movable with respect thereto for controlling the same.

5. In an auxiliary transmission mechanism for motor vehicles, a driving shaft, a driven device rotatably mounted upon said shaft, in combination with mechanism connecting said shaft and said device for varying the relative angular velocities between said shaft and said device comprising a system of planetary gearing and a clutch member movable with respect thereto, and means adjacent each end of the clutch member for locking the same to the planetary system.

6. In an auxiliary transmission, a rotatable power shaft, devices associated with said shaft and adapted to be rotated thereby, in combination with mechanism for imparting variable speeds from said shaft to said devices, comprising a sun gear fixed to said shaft, planetary gears revoluble in the same plane with said sun gear, and a movable clutching means coöperating with said sun and planetary gears to effect one speed, and means engageable by said clutch member to effect another speed.

7. In an auxiliary transmission, a rotatable power shaft provided with a fixed member surrounding the same, a device rotatably mounted upon said shaft and adapted to be rotated thereby, in combination with mechanism for imparting variable speeds from said shaft to said devices, comprising a sun gear fixed to rotate with and also fixed against longitudinal movement on said shaft, planetary gearing revoluble around and in the same plane with said sun gear, and means coöperating with said planetary gears and adapted to move into engagement with and adapted to be disengaged from said fixed member for effecting different speeds.

8. In an auxiliary transmission, a rotatable shaft, a fixed member, a device associated with said shaft including planetary gears carried thereby, a sun gear fixed to said shaft and rotatable always in the same plane, and an internal gear member movable in one direction to engage the sun gear and movable in the other direction to engage said fixed member.

9. In a transmission device, a rotatable driving shaft, a fixed member in proximity thereto, a driven device rotatably mounted upon said shaft, in combination with mechanism connecting said shaft and said device for varying the relative angular velocities between said shaft and device comprising a system of planetary gearing including planetary gears and a sun gear fixed relatively to each other with respect to lateral movement, and a movable clutch member operatively connecting said fixed member and said planetary gearing.

10. In a transmission device, a rotatable driving shaft, a fixed member located in proximity thereto, a driven device rotatably mounted upon said shaft, in combination with mechanism connecting said shaft and said device for varying the relative angular velocities between said shaft and device comprising a planetary and sun gear fixed relatively to each other and to said device with respect to lateral movement, and a laterally movable clutch member operatively connecting said fixed member and planetary and sun gears.

11. In a transmission device, a rotatable shaft, a fixed member located in proximity thereto, a driven device rotatably mounted upon said shaft, planetary gears mounted upon said shaft having a carrier or disk rigid with said driven device, a sun gear rotatable with but fixed against lateral movement on said shaft, and a movable clutch member adapted to lock with said fixed member and having an internal gear meshing with said planetary gear.

12. In a transmission device, a rotatable shaft, a fixed member located in proximity thereto, a driven device rotatably mounted upon said shaft, a disk or carrier rigid with said driven device provided with planetary gears thereon, a sun gear rotatable with but fixed against lateral movement on said shaft, and a movable clutch member having an internal gear meshing with said planetary gear, and provided with means for engaging either said fixed member whereby the same is held against rotation or for engaging said sun gear whereby said sun and planetary gears and said clutch member rotate as a unit.

13. In a transmission device, a driving shaft, a driven device rotatably mounted upon said shaft, in combination with mechanism connecting said shaft and said device for varying the relative angular velocities between said shaft and said device comprising a system of sun and planetary gearing fixed against lateral movements, a fixed member adjacent thereto, and a clutch movable into locking engagement with said fixed member for effecting a low speed but movable into engagement with said planetary gearing to rotate as a unit therewith for effecting a high speed.

14. A structure as specified in claim 13 wherein the clutch member is provided at each end with means for interlocking the same to the planetary system.

15. In a transmission device, a driving shaft, a driven device rotatably mounted upon said shaft, in combination with mechanism connecting said shaft and said device for varying the relative angular velocities between said shaft and said device comprising a system of sun and planet gears in constant mesh with each other, a fixed member adjacent thereto, and a clutch provided with an internal gear in constant mesh with said planetary gears and movable into locking engagement with said fixed member for effecting one speed but movable into engagement with said system of gearing to rotate as a unit therewith for effecting a different speed.

16. A structure as specified in claim 15, wherein the system of gears are fixed against lateral movements.

17. A structure as specified in claim 15, wherein the system of gears are fixed against lateral movements, and wherein the sun gear is fixed to the driving shaft.

In testimony whereof I hereunto affix my signature.

W. MARION COPELAND.